(12) United States Patent
Ochiai et al.

(10) Patent No.: US 11,692,661 B2
(45) Date of Patent: Jul. 4, 2023

(54) STRAINER

(71) Applicant: KANE KOGYO Co., Ltd., Komaki (JP)

(72) Inventors: Masaru Ochiai, Kasugai (JP); Nobuki Saito, Kasugai (JP); Takashi Seino, Inuyama (JP)

(73) Assignee: KANE KOGYO CO., LTD., Komaki (JP)

( * ) Notice: Subject to any disclaimer, the term of this patent is extended or adjusted under 35 U.S.C. 154(b) by 0 days.

(21) Appl. No.: 17/570,488

(22) Filed: Jan. 7, 2022

(65) Prior Publication Data

US 2022/0221098 A1 Jul. 14, 2022

(30) Foreign Application Priority Data

Jan. 12, 2021 (JP) ................. 2021-002815

(51) Int. Cl.
| | | |
|---|---|---|
| *B01D 29/01* | (2006.01) | |
| *F16L 55/24* | (2006.01) | |
| *B01D 29/52* | (2006.01) | |
| *B01D 35/02* | (2006.01) | |
| *F16L 23/036* | (2006.01) | |
| *B01D 35/30* | (2006.01) | |

(52) U.S. Cl.
CPC ............. *F16L 55/24* (2013.01); *B01D 29/01* (2013.01); *B01D 29/52* (2013.01); *B01D 35/02* (2013.01); *B01D 35/30* (2013.01); *F16L 23/036* (2013.01); *B01D 2201/4092* (2013.01)

(58) Field of Classification Search
CPC ........ F16L 55/24; F16L 23/036; B01D 29/01; B01D 29/52; B01D 35/02; B01D 35/30; B01D 2201/4092; B01D 29/21; B01D 29/50; B01D 29/64
See application file for complete search history.

(56) References Cited

U.S. PATENT DOCUMENTS

RE32,711 E * 7/1988 Dickens ............... B01D 27/005
96/219

FOREIGN PATENT DOCUMENTS

JP 3348021 B2 2/2000

* cited by examiner

*Primary Examiner* — Waqaas Ali
(74) *Attorney, Agent, or Firm* — Flynn Thiel, P.C.

(57) ABSTRACT

A compact strainer having a small pressure loss which is easily cleaned without inserting and detaching screens in and from a strainer casing. Front and rear end portions of a tubular casing are respectively provided with an inlet and an outlet. A barrier divides in two a linear channel between the inlet and the outlet along a flowing direction and is provided on the outlet side so as to face the inlet. A filter portion surrounding the inlet is constituted by the barrier, a pair of screens laterally opposing each other and arranged at a predetermined interval are provided, and the upper and lower portions of an inner surface of an outer wall of the casing, and upper and lower regions of the outer wall are provided with opening portions with lids which make the inside of the filter portion communicate with the outside.

3 Claims, 7 Drawing Sheets

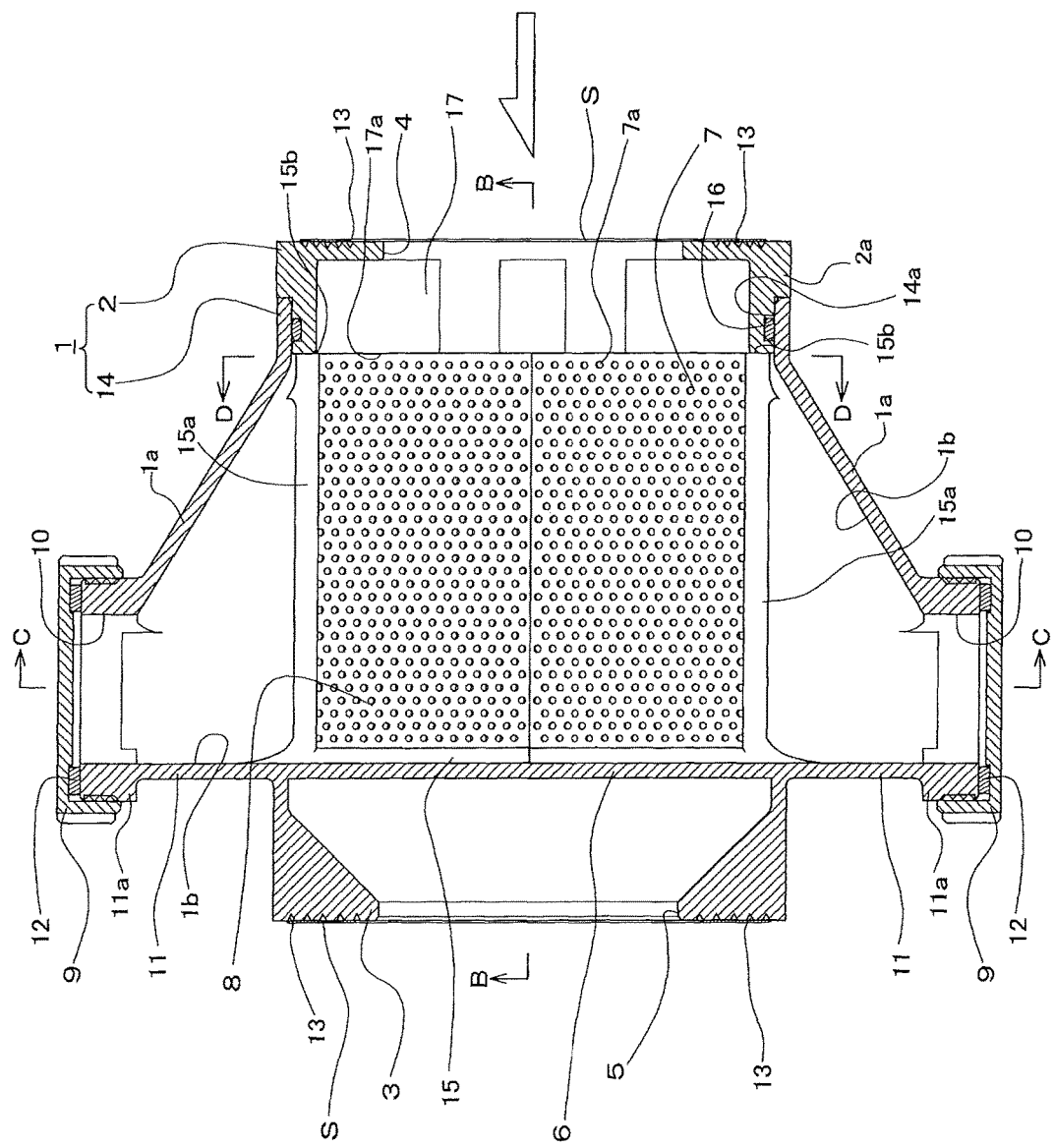
[Fig. 4]

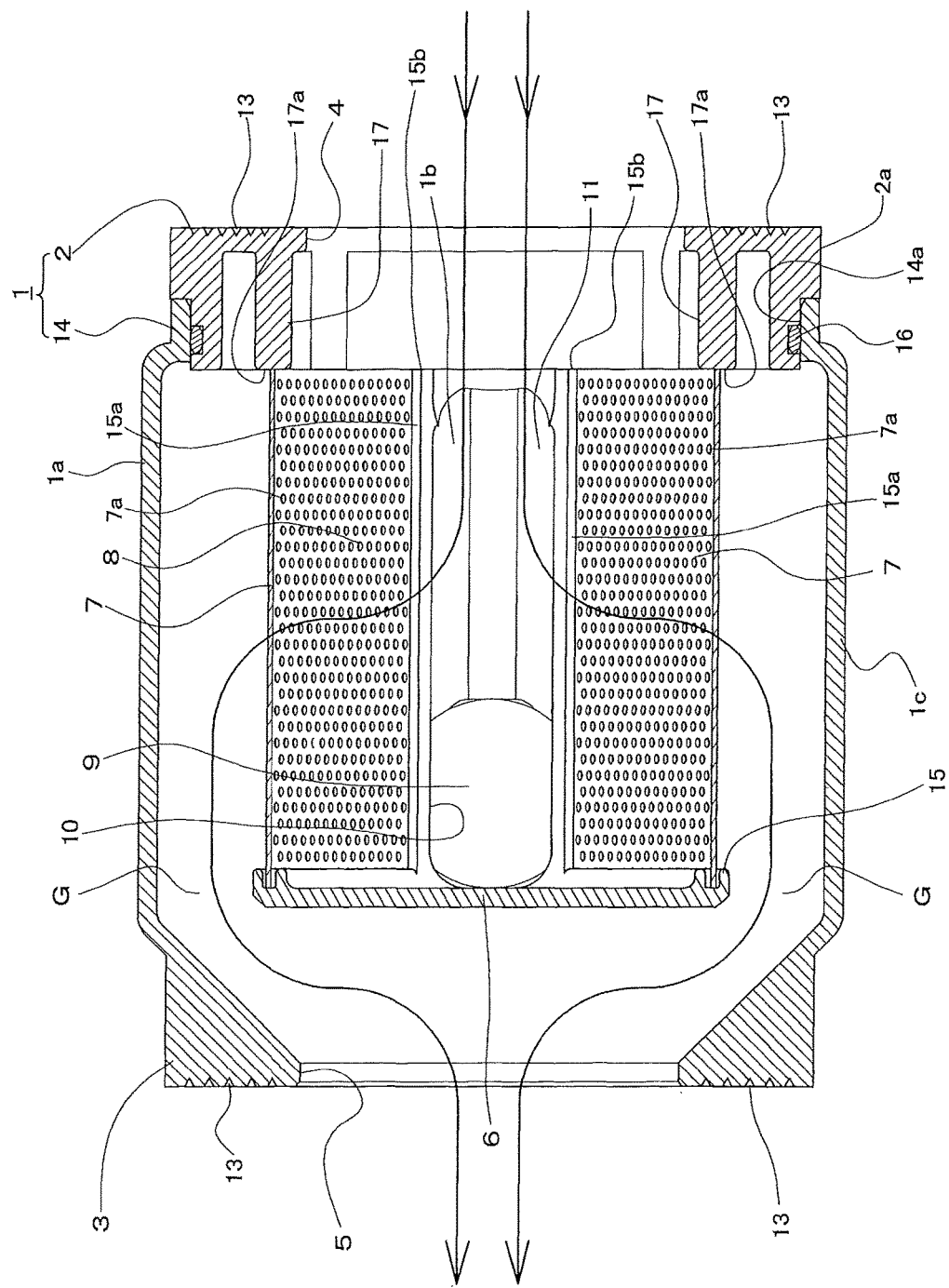
[Fig. 5]

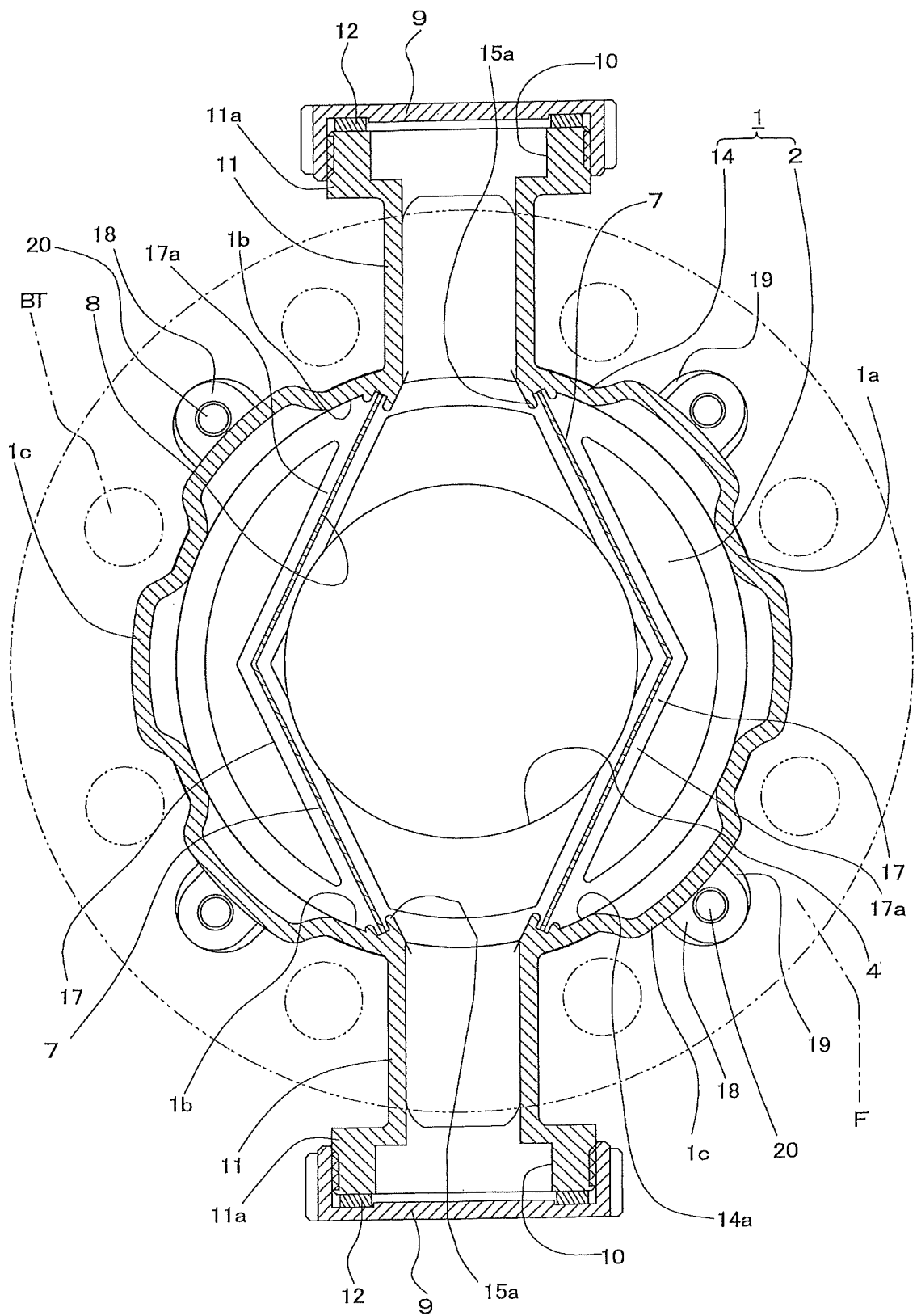
[Fig. 6]

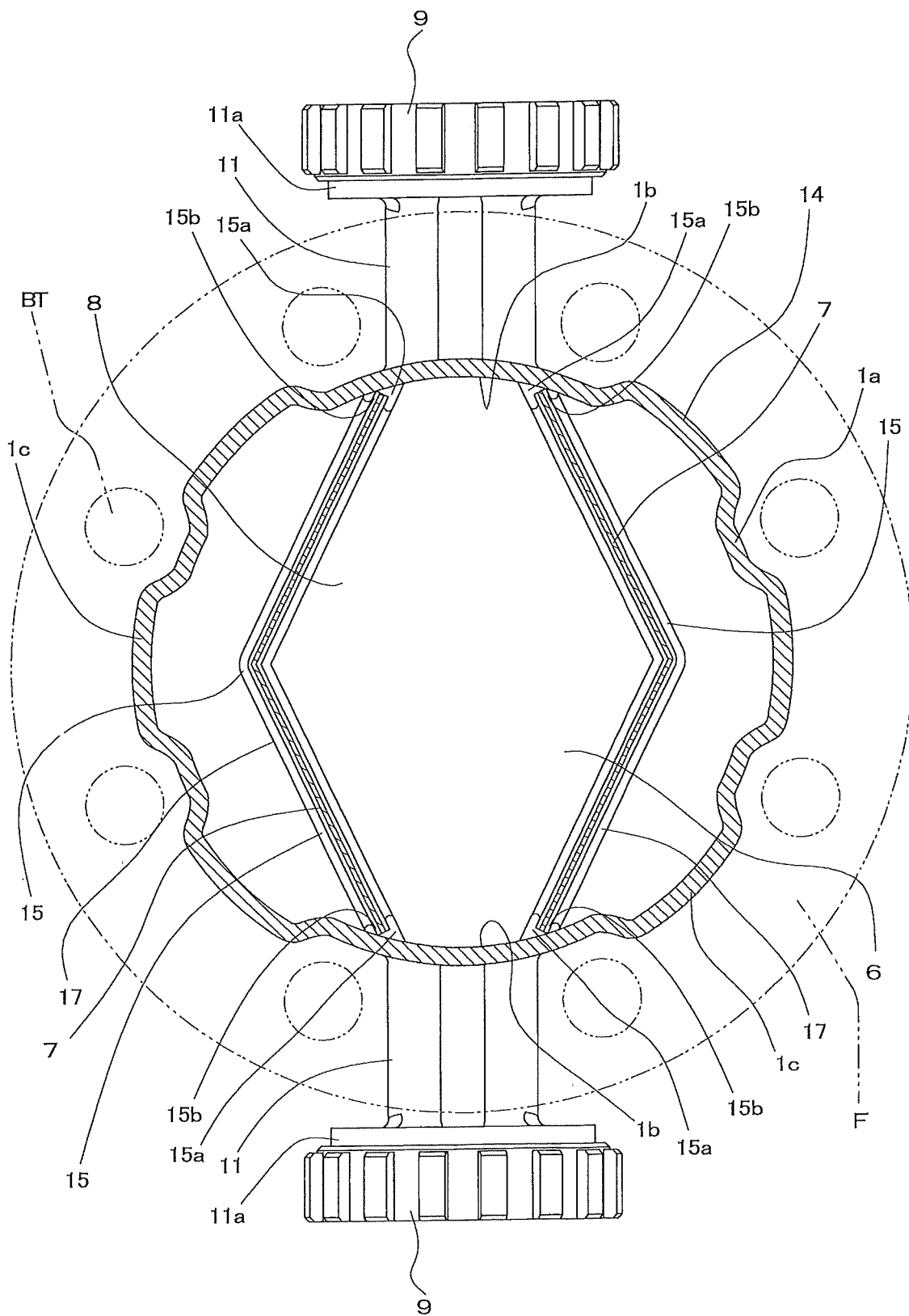
[Fig. 7]

STRAINER

CROSS-REFERENCE TO RELATED APPLICATIONS

This claims priority from Japanese Application No. 2021-002815, filed Jan. 12, 2021, the disclosure of which is hereby incorporated by reference in its entirety.

TECHNICAL FIELD

The present invention relates to a strainer that separates and removes foreign substances such as scales and dust in a fluid flowing in various types of piping lines.

BACKGROUND ART

Patent Literature 1 discloses a Y type strainer configured such that the front and rear ends of a casing which are located on the same axis are respectively provided with an inlet and an outlet, an accommodation portion for a bottomed tubular screen having a plurality of small holes in the circumferential surface is formed by bending the channel between the inlet and the outlet downward at the middle of the channel and extending the bent portion of the bent channel obliquely downward to the outlet side, the screen is loaded in the accommodation portion such that an opening end faces the inlet side, and the lower end opening portion of the accommodation portion which the closed end of the screen faces is closed with a lid member.

This Y type strainer filters out scales, dust, and the like by causing a fluid flowing in the channel from the inlet to the outlet to pass through the screen.

The screen is cleaned as follows. First, the on-off valve communicating with the outlet/inlet of the strainer in the piping in which the strainer is installed is closed to stop the flow of a fluid in the piping. The lid member is then removed to take out the screen. The foreign substances caught in the screen are removed, and dust adhering to the screen itself is removed.

CITATION LIST

Patent Literature

Patent Literature 1: Japanese Patent No. 3348021

SUMMARY OF THE INVENTION

Technical Problem

However, in the casing of the Y type strainer described above, the screen accommodation portion protrudes obliquely downward to the outlet side, and hence the total size of the strainer inevitably increases. In addition, since the channel between the inlet and the outlet is bent downward, a fluid is filtered while bending and running in the strainer. As a result, the flow resistance increases, and the pressure loss increases.

Moreover, in performing maintenance such as cleaning of the strainer, it is necessary to take out the screen from the lower end opening portion of the accommodation portion which is the lowermost region of the Y type strainer. Accordingly, there is a problem that a maintenance space with a screen extraction margin which is at least longer than the axial length of the screen must be secured on the extended axis of the lower end of the accommodation portion.

The present invention has an object to provide a compact strainer having a small pressure loss which can be easily cleaned without inserting and detaching screens in and from the casing of the strainer.

Solution to Problem

In consideration of the above problem, a strainer according to the present invention is characterized in that front and rear end portions which a tubular casing has in an axial direction are respectively provided with an inlet connected to an upstream side of the piping and an outlet connected to a downstream side of the piping, the inlet of the front end portion and the outlet of the rear end portion each are formed to have a diameter smaller than an inner diameter of the casing, a barrier that divides in two a linear channel between the inlet and the outlet is provided on an outlet side vertically throughout in the casing so as to face the inlet, a filter portion surrounding the inlet is constituted by the barrier, a pair of screens laterally opposing each other arranged at a predetermined interval, and upper and lower portions of an inner surface of an outer wall of the casing, and upper and lower regions of the outer wall are provided with opening portions with lids which make an inside of the filter portion communicate with the outside.

In addition, the strainer is characterized in that the casing is clamped between piping flanges fastened with bolts and nuts, the front and rear end portions jointed to the piping flanges each are made flangeless, the upper and lower regions of the outer wall are formed into protruding portions that are formed to expand outward in a laterally flat mountain shape elongated back and forth so as to be able to extend through between the bolts installed between the piping flanges, and top portions of the protruding portions are provided with opening portions with lids.

Furthermore, the strainer according to claim 2 is characterized in that regions of the outer wall which correspond between the bolts except for the upper and lower regions are formed to expand outward to have a casing volume such that the sum of left and right channel cross sectional areas of the filter portion in the casing is not less than the area of the outlet.

Advantageous Effects of Invention

That is, in the present invention, the front and rear end portions which the tubular casing has in the axial direction are respectively provided with the inlet connected to the upstream side of the piping and the outlet connected to the downstream side of the piping, the inlet of the front end portion and the outlet of the rear end portion each are formed to have a diameter smaller than the inner diameter of the casing, the barrier that divides in two the linear channel between the inlet and the outlet is provided on the outlet side vertically throughout in the casing so as to face the inlet, the filter portion surrounding the inlet is constituted by the barrier, the pair of screens laterally opposing each other at a predetermined interval, and the upper and lower portions of the inner surface of the outer wall of the casing, and the upper and lower regions of the outer wall are provided with the opening portions with the lids which make the inside of the filter portion communicate with the outside. Accordingly, the fluid flowing from the upstream of the piping into the casing through the inlet passes through the left and right screens after the linear channel of the fluid to the outlet is divided in two by the barrier of the filter portion. At this time, the screens filter out foreign substances in the fluid. The foreign substances are caught in the filter portion to reliably prevent the foreign substances in the fluid from flowing out to the downstream side of the filter portion.

In addition, since the filter portion can be placed on the same axis as that of the linear channel in the casing, it is possible to reduce the size of the strainer. It is also possible to significantly reduce the pressure loss because the flowing direction of the fluid remains linear.

At the time of maintenance such as cleaning of the strainer, the flow of the fluid in the piping is stopped. Subsequently, the upper and lower lids are removed to open the respective opening portions to make the inside of the filter portion communicate with the outside, and a cleaning tool such as an existing cleaning brush is inserted into the filter portion through the upper opening portion to discharge and remove the foreign substances remaining in the filter portion to the outside. Alternatively, injecting tap water or the like from the upper opening portion into the filter portion can discharge foreign substances and deposits in the filter portion from the lower opening portion to the outside together with the injected water. After maintenance, it is possible to check the state in the filter portion by inserting a fiber scope from each opening portion.

In this manner, according to the present invention, since the strainer can be easily cleaned without taking out the screens from the casing to the outside, there is no need to secure a wide maintenance space required by a conventional Y type strainer. This makes it possible to prevent troubles such as deformation of the screens caused by repetitive attachment/detachment of the screens for repetitive maintenance of the Y type strainer, vibration of the screens during use upon occurrence of gaps due to contact failures at screen installation portions in the casing, and the flow of foreign substances to the downstream through gaps.

The casing is a so-called wafer-shaped casing that is held between piping flanges fastened with bolts and nuts with the front and rear end portions joined to the piping flanges being made flangeless. In an installation state with respect to the piping, the casing is held between the piping flanges provided at the connection end portion of a piping member, and the bolts extending between the piping flanges are fastened with nuts, thereby interposing and supporting the casing between the piping flanges. Accordingly, as compared with the flange type strainer, the face-to-face dimension (the dimension between the front and rear end portions) of the strainer is reduced by the thickness of the flange. This makes it possible to significantly reduce the total weight of the strainer and halve the number of bolts required to install the strainer in the piping, thereby reducing the interposing space for the casing between the piping members and allowing efficient strainer installation operation with respect to the piping. In addition, this can reduce the material cost required for the flanges for the strainer. Accordingly, it is possible to greatly reduce the manufacturing cost.

As described above, even if a plurality of bolts are installed around the casing between the piping flanges to interpose and install the strainer between the piping flanges, the upper and lower regions of the outer wall each are formed into a protruding portion that expands outward in a laterally flat mountain shape elongated back and forth so as to extend through between the bolts installed between the piping flanges. In addition, since the top portions of the protruding portions are provided with the opening portions with the lids and the protruding portions protrude outward between the bolts, the lids of the opening portions can be easily opened and closed without any troubles.

In addition, since the protruding portions are formed to be long back and forth, the distal end of the cleaning brush inserted from the upper opening portion can be widely moved back and forth at the time of cleaning of the strainer. This makes it possible to easily discharge foreign substances in the filter portion to the outside through the lower opening portion.

Furthermore, the mountain shapes of the upper and lower protruding portions are formed into symmetrical shapes, and for example, one of the front and rear oblique sides is set to be clearly longer than the other side. This makes it possible to recognize, from the appearance of the strainer, a specific one of the front and rear end portions on which the inlet or the outlet is arranged, thereby preventing confusion between the inlet and the outlet at the time of strainer piping installation.

Moreover, the regions of the outer wall which correspond between the bolts except for the upper and lower regions are formed to expand outward to have a casing volume such that the sum of the left and right channel cross sectional areas of the filter portion in the casing is not less than the area of the outlet. Accordingly, this provides significant practical effects, such as making it possible to secure a sufficient flow rate at the time of passing of a fluid through the strainer even if the installation of a plurality of bolts around the casing between the piping flanges imposes a restriction on the size of the casing in a strainer installation state with respect to piping.

BRIEF DESCRIPTION OF DRAWINGS

FIG. 4 is a sectional view taken along A-A in FIG. 2;

FIG. 5 is a sectional view taken along B-B in FIG. 4;

FIG. 6 is a sectional view taken along C-C in FIG. 4; and

FIG. 7 is a sectional view taken along D-D in FIG. 4.

DESCRIPTION OF EMBODIMENTS

Figure 1:
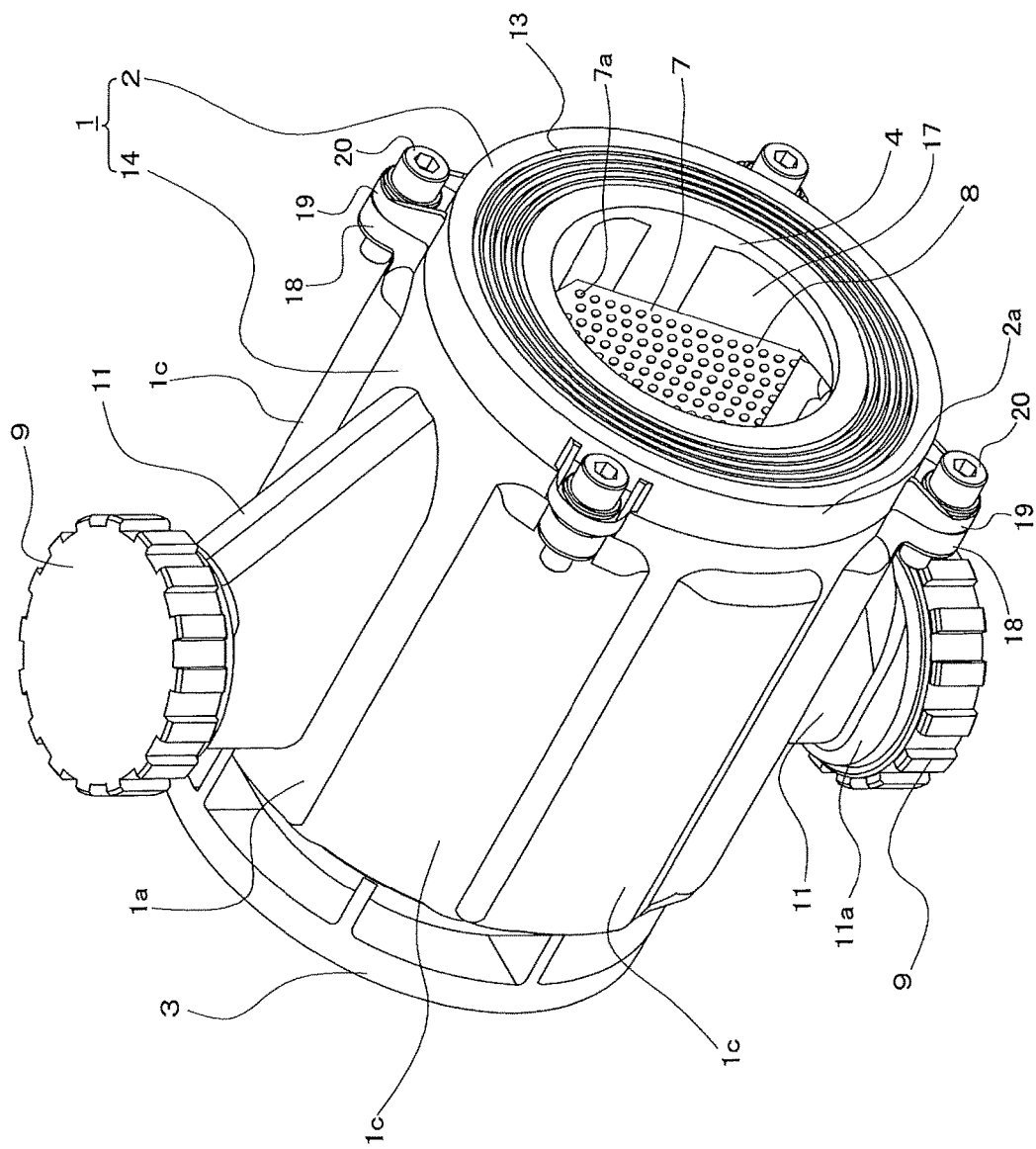
FIG. 1 is a perspective view of a strainer according to the present invention.
Figure 2:
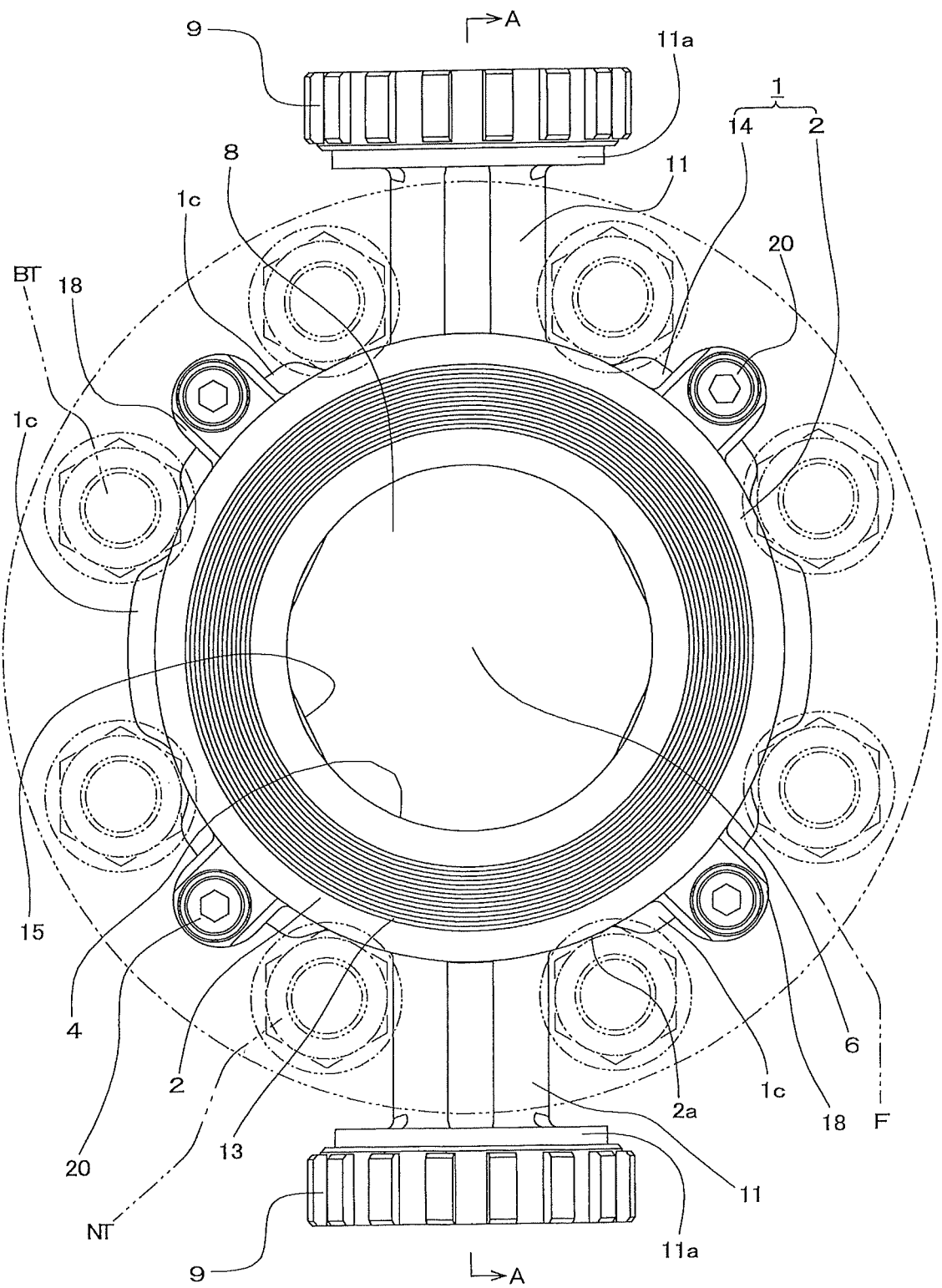
FIG. 2 is an upper front view of the same.

An embodiment of the present invention will be described below with reference to the accompanying drawings.

A strainer according to the present invention includes a tubular casing 1 having front and rear end portions 2 and 3 in the axial direction, which are respectively provided with an inlet 4 connected to the upstream side of the piping and an outlet 5 connected to the downstream side of the piping. The inlet 4 of the front end portion 2 and the outlet 5 of the rear end portion 3 each are formed to have a diameter smaller than the inner diameter of the casing 1. The casing 1 is internally provided with a barrier 6 vertically throughout on the outlet 5 side so as to face the inlet 4 and the outlet 5 and divide in two a linear channel between the inlet 4 and the outlet 5. A filter portion 8 surrounding the inlet 4 is constituted by the barrier 6, a pair of screens 7 laterally opposing each other arranged at a predetermined interval, and the upper and lower portions of an inner surface 1b of an outer wall 1a of the casing 1. The upper and lower regions of the outer wall 1a of the casing 1 are provided with opening portions 10 with lids 9 communicating with the inside and outside of the filter portion 8.

Figure 3:
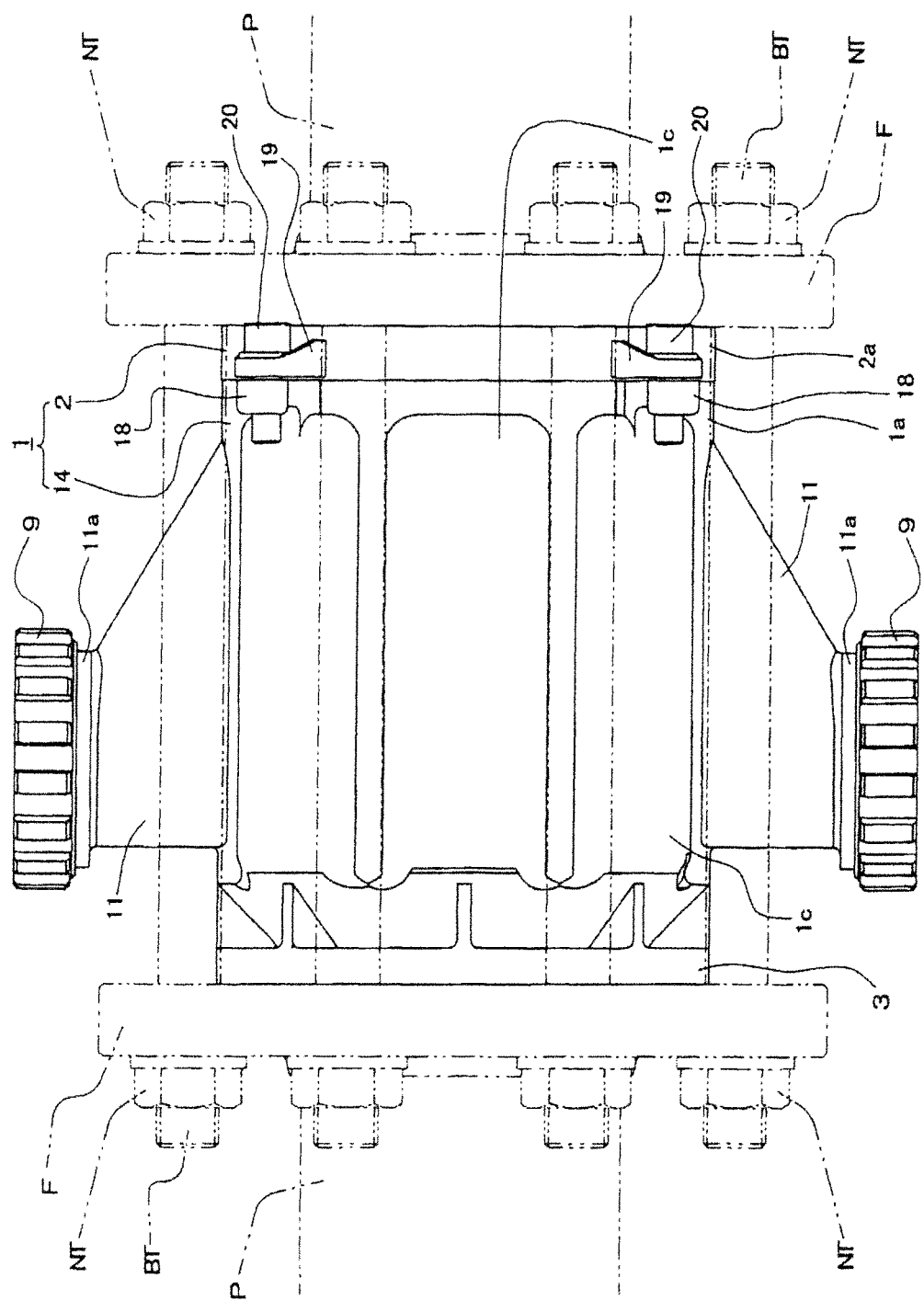
FIG. 3 is an upper side view of the same.

The casing 1 is a so-called wafer-shaped casing that is held between piping flanges F fastened with bolts (long screws) BT and nuts NT with the front and rear end portions 2 and 3 joined to the piping flanges F being made flangeless. As shown in FIG. 3, in an installation state with respect to piping arranged in the horizontal direction, the casing 1 is held between the piping flanges F provided at the connection end portion of a piping member P, and the bolts BT extending between the piping flanges F are fastened with nuts NT, thereby interposing and supporting the casing 1 between the piping flanges F.

Accordingly, as compared with the flange type strainer, the face-to-face dimension (the dimension between the front and rear end portions 2 and 3) of the strainer according to this embodiment is reduced by the thickness of the flange. This makes it possible to significantly reduce the total weight of the strainer and halve the number of bolts required to install the strainer in the piping, thereby reducing the interposing space for the casing between the piping members P and allowing efficient strainer installation operation with respect to the piping. In addition, this can reduce the material cost required for the flanges for the strainer. Accordingly, it is possible to greatly reduce the manufacturing cost.

The upper and lower regions of the outer wall 1a of the casing 1 are formed to expand outward in a laterally flat mountain shape elongated back and forth (the axial direction of the casing 1) (in the case shown in FIG. 3, the casing 1 has a trapezoidal side view with upper and lower opposite sides being parallel, one side on the outlet 5 side being a perpendicular on the same axis as that of the barrier 6, and one side on the inlet 4 side being oblique) so as to be able to extend through between the bolts BT installed between the piping flanges F, thereby forming vertically symmetrical protruding portions 11. A top portion 11a of each protruding portion 11 is formed into a circular dish shape inwardly provided with the opening portion 10. The lid 9 is airtightly or watertightly fitted and screwed on the top portion 11a through a ring-shaped flat packing 12 having a plurality of annular grooves on the upper and lower surfaces.

In this manner, the inlet 4 side is provided with the oblique sides of the protruding portions 11, and the outlet 5 side is provided with the perpendiculars of the protruding portions 11. This makes it possible to recognize, from the appearance of the strainer (casing 1), a specific one of the front and rear end portions 2 and 3 on which the inlet 4 or the outlet 5 is arranged, thereby preventing confusion between the inlet 4 and the outlet 5 at the time of strainer piping installation.

Regions of the outer wall 1a which correspond between the bolts BT except for the upper and lower regions provided with the protruding portions 11 are formed to expand outward in a terrace shape elongated back and forth (to be referred to as terrace portions 1c hereinafter) so as to have a casing volume such that the sum of the left and right channel cross sectional areas of the filter portion 8 in the casing 1 is equal to or more than the area of the outlet 5.

This makes it possible to secure a sufficient flow rate at the time of passing of a fluid through the strainer even if the installation of a plurality of bolts BT around the casing 1 between the piping flanges F imposes a restriction on the size of the casing 1 in a strainer installation state with respect to piping.

The joint surfaces of the front and rear end portions 2 and 3 with respect to the piping flanges F each are engraved with a plurality of concentric annular grooves 13 used to prevent the slipping of a ring-shaped flat packing S (shown in only FIG. 4) interposed between the piping flanges F.

The front end portion 2 is detachably attached to the casing 1 to accommodate and hold the screens 7 in a main body 14 of the casing 1.

The front end of the main body 14 is provided with circular opening portions 14a in which the front end portion 2 is sealed and fitted. The barrier 6, which has a hexagonal plate shape elongated up and down with short upper and lower sides being laterally and longitudinally line-symmetrical, is formed between the upper and lower portions of the inner surface 1b on a side close to the outlet 5 of the main body 14. Gaps G as parts of the channel are formed left and right in the same plane as the barrier 6.

Laterally symmetrical support frames 15 having a concave cross section are formed on the surface (front surface) facing the circular opening portions 14a (inlet 4) of the barrier 6. The rear ends of the screens 7 (to be described later) are attached to the support frames 15 along the angle bracket (< >) shaped left and right side edges of the front surface. Support frames 15a having a concave cross section are respectively continuously formed on the upper and lower ends of the left and right support frames 15. The upper and lower side edges of the screens 7 are attached to the support frames 15a along the respective generating lines extending to near the circular opening portions 14a at the upper and lower positions on the inner surface 1b of the main body 14.

The left and right screens 7 are respectively bent in the angle bracket (<) shape and the angle bracket (>) shape (see FIG. 7) such that thin square punching plates in which many small holes 7a are drilled conform to the left and right side edge shapes of the barrier 6. The strength of each screen 7 is increased by bending and work-hardening in such bending formation.

The upper and lower side edges of the screens 7 are slid from upper and lower small mouths 15b, which face the circular opening portions 14a of the support frames 15a respectively linearly provided on the upper and lower portions of the inner surface 1b of the main body 14, toward the barrier 6 side along the support frames 15a to insert the respective angle bracket (<) shaped rear end and the angle bracket (>) shaped rear end of the screens 7 into the support frames 15 provided along the angle bracket (< >) shaped left and right side edges of the front surface of the barrier 6, thereby attaching the rear ends and the upper and lower side edges of the screens 7 to the support frames 15 and 15a.

The circular plate of the front end portion 2, which is provided with the inlet 4, is provided with a peripheral wall 2a thicker than the outer wall 1a having an outer diameter equal to that of the circular opening portion 14a. The outer diameter of the rear half portion of the peripheral wall 2a is reduced to be able to be sealed and fitted in the circular opening portion 14a, and an O-ring 16 is mounted in the concave groove provided around the rear half portion.

The rear surface of the front end portion 2 is provided, in the same plane as the rear end surface of the peripheral wall 2a, with press frames 17 having abutment surfaces 17a with respect to the front ends of the screens 7 accommodated in the main body 14, with a back view (see FIG. 6) having the same width as that of the support frames 15 and an angle bracket (< >) shape.

The front end portion 2 is airtightly or watertightly sealed and fitted in the circular opening portion 14a of the main body 14 with the O-ring 16, and protrusions 18 and 19 that protrude at four positions on the front half portion of the peripheral wall 2a of the front end portion 2 so as to be able to extend through between the bolts BTs are jointed and screwed to the front portions of the four terrace portions 1c around the circular opening portion 14a with screws 20. This causes the abutment surfaces 17a of the press frames 17 to press the front ends of the screens 7, which are accommodated in the main body 14 by being attached to the support frames 15 and 15a, thereby forming the casing 1 (strainer) internally having the filter portion 8.

Note that the upstream and downstream of the piping in which the strainer is installed are provided with on-off valves (not shown) that stop the flow of a fluid in the piping at the time of maintenance of the strainer.

The strainer according to the present invention can be applied to not only piping installed in the horizontal direction described above but also piping arranged in the vertical direction. In this case also, as is clear, the inlet 4 is connected to the upstream side of the piping, and the outlet 5 is connected to the downstream side of the piping.

According to the strainer according to the present invention configured as described above, the front and rear end portions 2 and 3 of the casing 1 are respectively jointed to the piping flanges F provided on piping members P, the bolts BT respectively extend through the bolt holes of the piping flanges F, and the end portions of the bolts BT are fastened with nuts NT, thereby interposing and fixing the casing 1 between the piping members P. In addition, the flat packing S is interposed between the joint surfaces of the front and rear end portions 2 and 3 with respect to the piping flanges F to make the casing 1 and the piping members P water-tightly or airtightly communicate with each other.

As shown in FIGS. 3, 6, and 7, concerning the casing 1 installed in the piping, the protruding portions 11 protruding from the upper and lower portions of the outer wall 1a extend through between the bolts BT, and the terrace portions 1c are arranged on the regions of the outer wall 1a which correspond between the bolts BT except for the upper and lower regions. Making the protruding portions 11 extend through between the bolts BT allows the lids 9 provided on the top portions 11a to easily open and close the opening portions 10 without making the protruding portions 11 protruding on the outer wall 1a and the terrace portions 1c interfere with the installation state of the bolts BT between the piping flanges F and F1.

The fluid flowing from the upstream side of the piping into the casing 1 through the inlet 4 passes through the left and right screens 7 after the linear channel of the fluid to the outlet 5 is divided in two by the barrier 6 of the filter portion 8. At this time, the screens 7 filter out foreign substances in the fluid. The foreign substances are caught in the filter portion 8 to reliably prevent the foreign substances in the fluid from flowing out to the downstream side of the filter portion 8.

In addition, since the filter portion 8 can be placed on the same axis as that of the linear channel in the casing 1, it is possible to reduce the size of the strainer. It is also possible to significantly reduce the pressure loss because the flowing direction of the fluid remains linear.

At the time of maintenance such as cleaning of the strainer, the flow of the fluid in the piping is stopped first by closing the on-off valves communicating with the inlet 4 and the outlet 5 in the piping in which the strainer is installed.

Subsequently, the upper and lower lids 9 are removed to open the opening portions 10 to make the filter portion 8 communicate with the outside, and a cleaning tool such as an existing cleaning brush is inserted into the filter portion 8 through the upper opening portion 10 to discharge and remove the foreign substances remaining in the filter portion 8 from the lower opening portion 10 to the outside.

At this time, since the protruding portions 11 are formed to be long back and forth, the distal end of the cleaning brush inserted from the upper opening portion 10 can be widely moved back and forth. This makes it possible to easily discharge and remove foreign substances in the filter portion 8 to the outside through the lower opening portion 10.

In addition, injecting tap water or the like from the upper opening portion 10 into the filter portion 8 can easily discharge foreign substances and deposits in the filter portion 8 from the lower opening portion 10 to the outside together with the injected water.

After maintenance, it is possible to check the state in the filter portion 8 by inserting a fiber scope from each opening portion 10.

In this manner, since the strainer can be easily cleaned without taking out the screens 7 from the casing 1 to the outside, there is no need to secure a wide maintenance space required by a conventional Y type strainer. This makes it possible to prevent troubles such as the deformation of the screens caused by repetitive attachment/detachment of the screens for repetitive maintenance of the Y type strainer, the vibration of the screens 7 during use upon occurrence of gaps due to contact failures at screen installation portions in the casing, and the flow of foreign substances to the downstream side through gaps.

The lids 9 are then fitted and screwed on the upper and lower top portions 11a to close the upper and lower opening portions 10, and the on-off valves are opened to make the upstream and downstream of the casing 1 communicate with each other, thereby completing the maintenance of the strainer.

REFERENCE SIGNS LIST

1: Casing
1a: Outer Wall
1b: Inner surface
2: Front end portion
3: Rear end portion
4: Inlet
5: Outlet
6: Barrier
7: Screen
8: Filter portion
9: Lid
10: Opening portion
11: Protruding portion
11a: Top portion
BT: Bolt
NT: Nut
F: Piping flange

The invention claimed is:
1. A strainer wherein front and rear end portions which a tubular casing has in an axial direction are respectively provided with an inlet connected to an upstream side of the piping and an outlet connected to a downstream side of the piping, the inlet of the front end portion and the outlet of the rear end portion each are formed to have a diameter smaller than an inner diameter of the casing, a barrier that divides in two a linear channel between the inlet and the outlet is provided on an outlet side vertically throughout in the casing so as to face the inlet, a filter portion surrounding the inlet is constituted by the barrier, a pair of screens laterally opposing each other arranged at a predetermined interval, and upper and lower portions of an inner surface of an outer wall of the casing, and upper and lower regions of the outer wall are provided with opening portions with lids which make an inside of the filter portion communicate with an outside.

2. The strainer according to claim 1, wherein the casing is clamped between piping flanges fastened with bolts and nuts, the front and rear end portions jointed to the piping flanges each are made flangeless, the upper and lower regions of the outer wall are formed into protruding portions that are formed to expand outward in a laterally flat mountain shape elongated back and forth so as to be able to extend through between the bolts installed between the piping flanges, and top portions of the protruding portions are provided with opening portions with lids.

3. The strainer according to claim 2, wherein regions of the outer wall which correspond between the bolts except for the upper and lower regions are formed to expand outward to have a casing volume such that the sum of left and right channel cross sectional areas of the filter portion in the casing is not less than the area of the outlet.

\* \* \* \* \*